United States Patent [19]

Wiersing et al.

[11] Patent Number: 4,891,475
[45] Date of Patent: Jan. 2, 1990

[54] AUTOMOTIVE BEAM SELECTOR SWITCH SYSTEM WITH FLASH-TO-PASS

[75] Inventors: Jeffrey K. Wiersing, Novi, Mich.; Stephen R. Christian, Lindley, N.Y.

[73] Assignee: United Technologies Automotive, Inc., Dearborn, Mich.

[21] Appl. No.: 261,433

[22] Filed: Oct. 24, 1988

[51] Int. Cl.⁴ .................. H01H 9/00; H01H 3/42; H01H 13/00
[52] U.S. Cl. .................. 200/5 R; 200/16 C; 200/524
[58] Field of Search .......... 200/5 R, 17 R, 16 C, 200/16 D, 61.27, 61.3, 61.31, 61.54, 519, 523, 524, 525, 526–528, 530–538

[56] References Cited

U.S. PATENT DOCUMENTS

| | | | |
|---|---|---|---|
| 3,691,323 | 9/1972 | Anderson et al. | 200/16 C X |
| 4,218,598 | 8/1980 | Iwasaki et al. | 200/524 |
| 4,382,167 | 5/1983 | Maruyama et al. | 200/524 |
| 4,449,022 | 5/1984 | Uno et al. | 200/524 |
| 4,467,159 | 8/1984 | Ota et al. | 200/524 |
| 4,514,608 | 4/1985 | Murata | 200/524 |
| 4,531,026 | 7/1985 | Terajima et al. | 200/5 R |
| 4,636,601 | 1/1987 | Tanabe | 200/524 |
| 4,661,667 | 4/1987 | Sorimachi et al. | 200/314 |
| 4,670,629 | 6/1987 | Van Benthuysen et al. | 200/16 D X |

Primary Examiner—J. R. Scott

[57] ABSTRACT

A "hi/lo" headlight beam selector switch system having a "flash-to-pass" mode, including a terminal block having a back panel with a set of profiled terminal pads mounted thereon, at least one, linearly movable carrier having on its side facing the pads at least one contactor having multiple contact dimples thereon, the dimples being drawn linearly across the back panel interconnecting two or more pads as the carrier(s) move(s) along side them. In a first embodiment (FIGS. 1–3B) two separable carriers, the lower, "hi beam" one of which can be latched down in place, have two return springs, a weaker one positioned between them and a stronger one under the bottom of the "hi beam" carrier; while in a second embodiment (FIGS. 4 & 5) a single carrier working with only three terminal pads compared with four pads is used. In the first downward movement of the carrier(s) the "flash-to-pass" circuit is closed, while maintaining the "lo" beams "on;" while, if a further linear movement is used, the lower or sole carrier is latched in place, selecting and maintaining the "hi" beams "on." Repeating the maximum linear movement unlatches the carrier, returning the selector switch to its "lo" beam mode. The latching and unlatching is achieved with the use of a detent spring having a projecting tip, which engages and co-acts with an asymmetrical "heart shaped" cam.

18 Claims, 5 Drawing Sheets (BEAM SELECTOR SWITCH WITH FLASH-TO-PASS.)

FIG.1
(BEAM SELECTOR SWITCH WITH FLASH-TO-PASS.)

FIG.5
3 TERMINAL BEAM SELECTOR SWITCH W/ FLASH TO PASS FEATURE

AUTOMOTIVE BEAM SELECTOR SWITCH SYSTEM WITH FLASH-TO-PASS

DESCRIPTION

1. Technical Field

This invention relates to automotive switching systems for electrical headlights and the like, and more particularly to a beam selection switch for switching to and from high and low beams for the headlights, and even more particularly to one in which there is included a "flash-to-pass" switch. Such a switch is particularly useful in the automotive field, in which a headlight beam selector switch having a momentary "flash-to-pass" position is required for quickly and easily warning other vehicles of the intent to pass or of the existence of a dangerous situation.

2. Background Art

Vehicle headlight systems typically allow a driver to choose between a low beam mode, a high beam mode, or, more recently, a "flash-to-pass" mode. A "flash-to-pass" mode refers to a driver momentarily energizing the high beam circuit in order to give warning to other drivers of an intention to pass or of a potential hazard. This is typically accomplished by urging a beam selector stalk mounted on the steering column toward the steering wheel and holding it down for a few seconds, and then releasing it, causing the headlights to momentarily "flash" in its high beam mode.

Previous switch designs used leaf spring contacts, sometimes having precious metal contact points especially for the "flash-to-pass" circuit. However, this type of design does not provide beneficial scrubbing or self-cleaning of the contact points. The absence of self-cleaning can result in an increased current draw due to poor conduction, and in some cases fusing of the contact points may occur. Precious metal contacts do help alleviate the fusing, but are inherently expensive.

Additionally, leaf spring type designs typically employed rocker over-centering, or rotary devices, which result in unacceptable stack-up dimensions. An additional problem with the prior art leaf spring contact style switches is that they were sometimes difficult to assemble.

Additionally, drivers typically desire that the lever control stalk used to actuate the "flash-to-pass" mode of the headlights have the same "home" position, usually about six to eight millimeters below the steering wheel, regardless of whether the headlights are in their high beam or low beam selected modes. Such consistent, particular positioning of the end of the control lever stalk allows the driver to easily engage the end of the stalk with the associated fingers of one hand to quickly and easily actuate the "flash-to-pass" mode or, alternatively, to select or de-select the high beam mode, as desired, all with similar motions and all starting at the same "home" point.

The present invention overcomes the above shortcomings in the existing art, as well as achieving the "home" lever positioning desired in the marketplace. Furthermore, the switch systems disclosed herein require low functional effort due to a fewer number of parts, lower spring rates, and the reduction of the frictional surface area(s) to be overcome in actuating the switch. Additionally, the present invention allows for the beam selector stalk to have a "short throw" and to return to a constant "home position" with respect to the steering wheel, regardless of which detent position (high or low beam) the switch may happen to have been in.

DISCLOSURE OF INVENTION

The present invention is thus directed to a "hi/lo" headlight beam selector switch, combined with a "flash-to-pass" mode, in which the various switching components undergo linear travel, in which at least one carrier carrying at least one contactor having multiple contact dimples selectively interconnect various elongated and configured pads during the linear movement of the carrier(s). These linear movement(s) control(s) a power feed to the high beam for the "flash-to-pass" mode, while preferably maintaining the "lo" beam "on," and controls the selection of the "hi" beam(s) when the switch components are moved to their furthermost position. In the "hi" beam selection the carrier is latched down in its furthermost position.

Typically, the linear switch will be actuated by a pivoting control lever stalk mounted on the steering wheel column, which preferably is pulled toward the driver to actuate the switch, causing the internal switching elements to be moved down with respect to the configured or profiled, elongated, electrical contact pads. To convert the pulling action of the lever to pushing action, the switch is positioned on the opposite side of the lever pivot axis from the driver engageable part of the lever.

In a first embodiment two separate power feed lines are used for the switch, making a total of four terminals, one feed line for the "flash-to-pass" operation and one for the beam selector operation, and in which two, separable, linearly moveable carriers are used. A lower carrier is used for beam selection, which lower one is latched down in place when "hi" beam mode is selected, and an upper carrier is used for "flash-to-pass," which is always free to move back up to its "home" position, when the driver releases the control lever.

Two separate return springs are used, a stronger one positioned below the lower, beam selector carrier and a weaker one associated with the upper "flash-to-pass" carrier, positioned, for example, between the two carriers. This allows the two carriers to move together, when the "hi" beam is not selected (during which the lower carrier is unlatched), but also causes the upper carrier to return under the action of the weaker return spring, when the lower carrier is latched into place when the "hi" beam mode has been selected.

To thereafter unlatch the lower carrier, the control stalk lever is pulled again by the driver to its maximum extent, allowing the selector carrier to return to its "home" position under the action of the stronger return spring, when the driver again releases the lever. This latching and unlatching action preferably is achieved by the use of a detent spring having a projecting tip which co-acts with an asymmetrical "heart shaped" cam, about which the spring tip moves during a full cycle of operation. Such a detent spring can be mounted on the terminal block enclosure structure with the cam surface provided on the latchable carrier, or vice versa.

In a second, exemplary embodiment, a single, common power feed line or terminal is used, allowing the use of a single, latchable carrier carrying a single contactor with three contact dimples. This embodiment would be particularly useful in those headlight systems, which are desired or required to be "on," not only for night time travel, but in daylight as well.

Thus, the present invention is directed to a linear, push-push (or pull-pull) type switch, wherein, in the preferred embodiments, an asymmetrical "heart shaped" cam is engaged by a spring member to provide predetermined positioning and holding of a longitudinally movable carrier carrying spring-loaded movable contacts traveling along and over adjacent, longitudinal extended contact pads or terminals, in order to open or close appropriate circuits, including a momentarily closed "flash-to-pass" circuit, as well as high beam/low beam selection switching.

Thus, it is an object of the present invention to provide a combined beam selector switch with a "flash-to-pass" mode which is relatively compact in design, uses linear movement, and avoids the prior art problems referred to above.

It is a further object to provide a headlight/"flash-to-pass" switch which preferably will maintain the headlights in the low beam mode should the switch ever fail.

It is a still further object to provide a head-light/"flash-to-pass" switch in which all of the movement of the basic structural components are linear and which has at least two fully detented positions.

A still further object is to provide such a switching system in which the user actuating member is returned to the same "home" position, regardless of the fully detented mode it is in.

The foregoing and other objectives, features and advantages of the present invention will become more apparent from the following further description and drawings.

BRIEF DESCRIPTION OF DRAWINGS

FIG. 3A is a detailed, close-up, rear view of the beam selector carrier of FIGS. 1 & 2, while

MODES FOR CARRYING OUT THE INVENTION

Elemental Parts of 1st Embodiment

Figure 1:
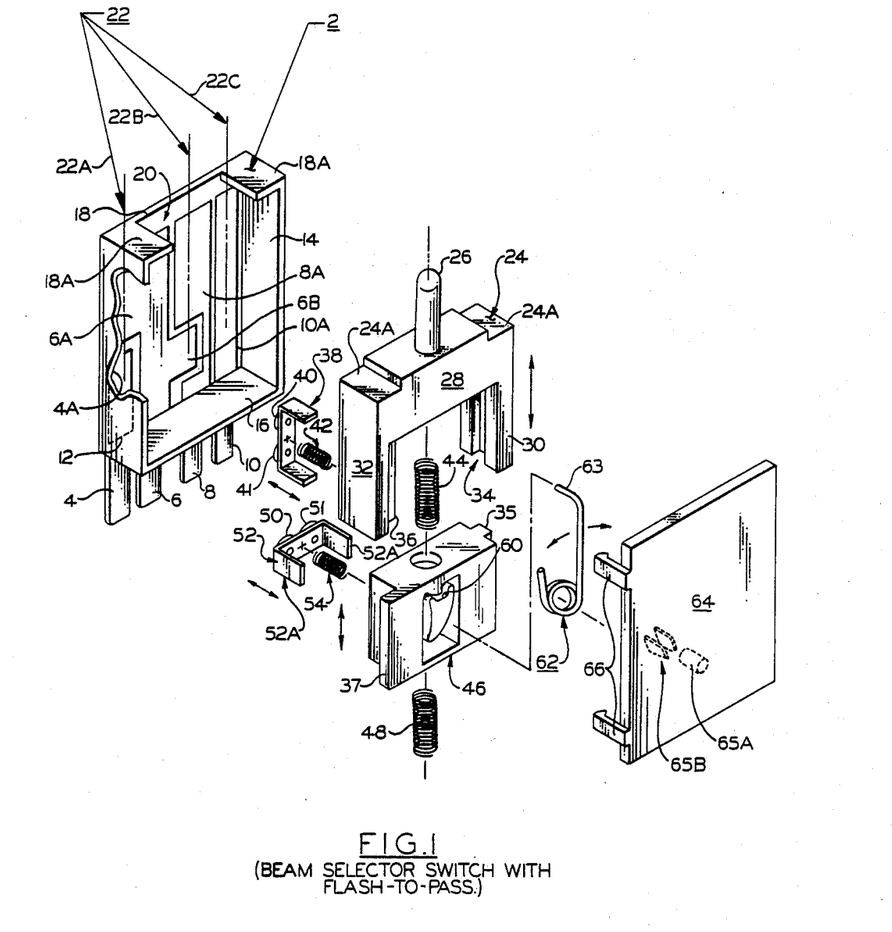
FIG. 1 is an isometric, exploded view of a first exemplary embodiment of the switching system of the present invention, showing its various elements in exploded array, including two, separable carriers, an upper or primary one carrying the "flash-to-pass" contacts and a lower or secondary one separately carrying the high/low beam selector contacts for a four terminal system.

As can be seen in FIG. 1, a first exemplary embodiment 1 of the switching system of the present invention includes a terminal block 2, an upper, "flash-to-pass" carrier 24, a lower, beam selector carrier 46 and a cover 64, along with associated return springs, floating contactors and associated, appropriately profiled, terminal pads or strips, as described more fully below. The carriers 24 & 46 are moved linearly up and down under the action(s) typically of the vehicle driver, causing the floating contactors carried by the carriers to appropriately make and break circuits associated with the terminal pads, all again as is explained more fully below The terminal block 2 includes, for four, externally extending, flat, terminal connectors or feed lines 4, 6, 8 & 10 for electrically interconnecting in the switching process the "flash-to-pass" feed line (4), the "hi beam" line (6), the "lo beam" line (8) and the beam selector feed line (10), respectively, to the appropriate components and circuitry of the vehicle (note FIG. 7). Each terminal connector is associated with and electrically connected to an internal, appropriately profiled or configured and located, longitudinally extended, terminal contact strip or pad 4A, 6A, 8A & 10A, respectively, over which floating contactors 52 & 38 for the beam selector and the "flash-to-pass," respectively, pass for appropriately making and breaking the various electrical circuits involved. As will be seen with respect to the alternate embodiment of FIG. 4, although it is the current standard practice to include separate feed lines 4 & 10 for the "flash-to-pass" and the high/low beam circuits, respectively; if desired, the two separate feed lines can be combined into a common line or pad, reducing the total number of terminals and pads to three.

The terminal block 2 includes four side walls or panels, namely the opposed side panels 12 & 14 and the opposed bottom and upper panels 16 & 18, which together with the base upon which the contact strips 4A–10A are located, form a box-like enclosure for the remaining elements of the switching system. The upper panel 18 has a "cut out" portion 20 to allow the upper, "flash-to-pass" carrier's projection 26 to extend out of the interior of the terminal block 2, with the side edge sections 18A of the upper panel 18 mating with like configured, side shoulders 24A on the upper part of the "flash-to-pass" carrier 24.

The "flash-to-pass" carrier 24, serving as an upper carrier, has an exterior projection or post 26 fixedly mounted on the upper bridging portion 28. The post 26 serves as a switch actuation member, which can be engaged or contacted from the exterior of the terminal block 2 to cause the internal components of the terminal block 2 to be linearly moved from switch mode to switch mode. The actuation member 26 can be designed to have positive connection means, such as for example, a slotted end, for connection to an external, supplemental actuation member, such as for example a pivoting control lever stalk mounted on the steering column of the steering wheel. Additionally, rather than extending out of the terminal block 2 as illustrated, the switch actuation member 26 could be "totally contained within" the confines of the closed terminal block with the external, supplemental actuation member extending into the confines to engage or be connected to the then internal actuating member.

The upper portion 28 terminates at its ends in two downwardly extending, opposed, parallel, side legs 30 & 32. The inwardly facing sides of the legs 30 & 32 include guide surfaces or keys 34 & 36, respectively, into or onto which mating side projections 35 & 37, respectively, of the beam selector carrier 46 fit, the surfaces providing interfacing guiding, sliding surfaces for the two carriers.

Although the two carriers 24 & 48 travel together in their initial "downward" travel, the upper carrier 24 thereafter may be called upon to separately travel back up, while the lower carrier 48 remains "locked" or latched down in place when the high beam mode of the switch is selected, as will be explained more fully below. The flat, face-to-face contacting surfaces 34 & 35 and 36 & 37 between the two carriers allow them to easily slide pass one another, when relative movement of them is called for, while maintaining their relative alignment together about their common longitudinal axes. Many designs are available to achieve this sliding interfacing, and, for example, rather than two side legs 30 & 32 being provided, a single leg design could be used, and rather than the lateral projection(s) on the bottom carrier mating with a key way on the upper carrier, the reverse design is possible.

The "flash-to-pass" carrier 24 carries on its back side a floating contactor, including a "flash-to-pass" contactor spring 42 and a floating "vertically" aligned, contactor element 38 with its rearwardly directed contact dimples 40 & 41. The proximal end of the spring 42 is located within a cylindrical chamber (not illustrated but substantively identical to the one described for the other carrier with reference to FIGS. 3A & 3B) located on the back-side of the leg 32, while the proximal tips of the side legs of the contactor 38 ride in slots (again not illustrated but substantively identical to the ones described for the other carrier with reference to FIGS. 3A & 3B) on the back-side of the leg 32.

When the switching system is fully assembled with the cover 64 connected to the terminal block 2, with the internal elements contained between them, the contactor 38 "floats" and is sandwiched between the back-side of the upper carrier 24 and the front, terminal pad side of the block 2; with the spring 42 causing it to biased in floating fashion with the contact dimples 40 & 41 traveling up and down along the vertical dimple tracking line 22A against the base of the block 2, as the upper carrier moves up and down.

In addition to the mating side projections or surfaces 35 & 37, referred to above, the beam selector carrier 46, serving as a lower carrier, includes top and bottom, cylindrical openings or chambers 47 & 49, respectively, which are sized to accommodate the proximal ends of the upper and lower spring returns 44 & 48, respectively. The other end of the upper return spring 44 fits into a like cylindrical chamber (not illustrated) in the underside of the bridging section 28 of the upper carrier 24, while the other end of the lower return spring 48 rests against the inner side of the panel 16 of the terminal block 2, when the switching system 1 is completely assembled.

The upper return spring 44 is relatively "weak," while the lower return spring 48 is relatively "strong." As a result, when the carriers are in their upper most positions, the lower return spring 48 overcomes the resistance of the upper return spring 44, keeping the two carriers in contact together for common movement with each other, as if they were of a common integral construction. On the other hand, when the lower carrier 46 is "locked" or latched down in its high beam position, in an action explained more fully below, the upper return spring 44 causes the upper carrier 24 to return back up to its uppermost position, when the driver releases the lever stalk.

Figure 3A:
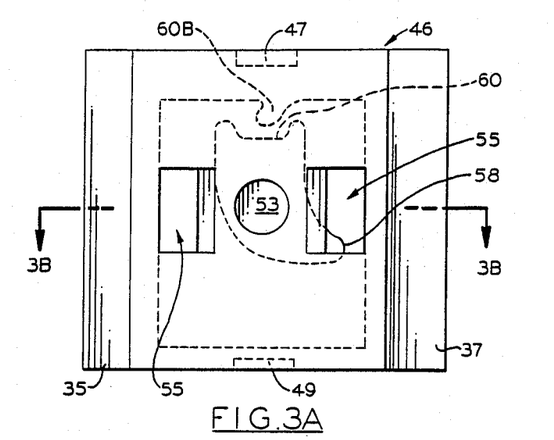
Figure 3B:
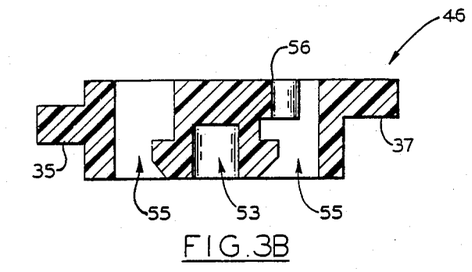
FIG. 3B is a "horizontal" cross-sectional view of the beam selector carrier, taken along section line 3B—3B of FIG. 3A.

As can be seen in FIGS. 3A & 3B, a back-side cylindrical opening 53 is provided to accommodate the proximal end of the beam selector spring 54 for floating the beam selector contactor 52 on the back side of the beam selector carrier 46. Vertical slots 55 are provided on the back-side, into which are received the side legs 52A of the contactor 52. It should be understood that the mounting details for the contactors 38 & 52 are not part of the present invention, and they can be mounted in any effective, desirable way.

The interfacing structures and "floating" operation of the "horizontal" beam selector contactor 52 is substantively identical to that described above with respect to the vertical, "flash-to-pass" contactor 38, except for their relative orientation, with the beam selector contact dimples 50 & 51 bridging across and riding along the contact dimple lines 22B & 22C, respectively.

Figure 2:
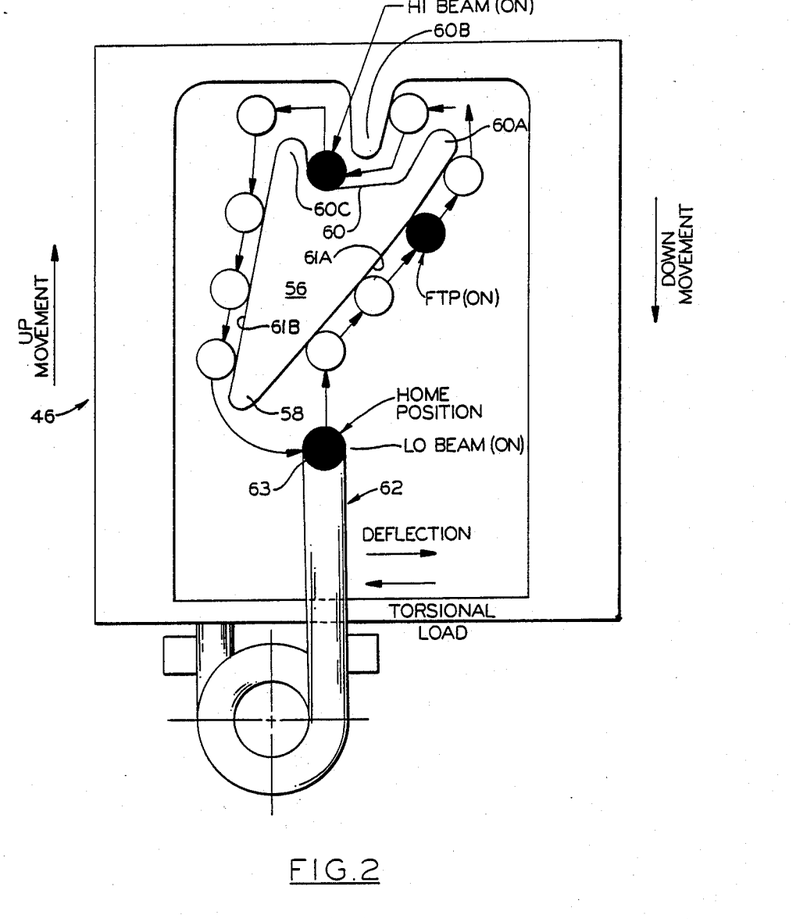
FIG. 2 is a detailed, close-up, frontal view of the longitudinally moveable beam selector carrier element of FIG. 1, showing the relative travel of the engaging tip of the detent spring as it moves up, along and around the asymmetrical "heart" shaped cam as the carrier is moved longitudinally down (and up) under the various possible switching actions of the driver moving the lever stalk (not illustrated).

As can be seen in general in FIG. 1 and more particularly in FIG. 2 (and in phantom line in FIG. 3A), an asymmetrical "heart-shaped" cam 56 is provided within the center structure of the beam selector carrier 46, which cam has a confined top plateau area 60 located between two, somewhat offset, downwardly extending sides 61A & 61B terminating in upwardly projecting tips 60A & 60B. From the perspective of FIG. 2, a leftwardly offset bottom tip area 58 is provided at the bottom of the cam 56.

An engaging detent spring 62, having a distal end tip 63, is configured to co-act with the peripheral edges and projecting tips of the heart-shaped cam 56, as it moves about and around the periphery of the cam in a counter-clockwise direction as a result of the various possible movements of the lower beam selector carrier 46, in an operation explained more fully below.

As can be seen in phantom line in FIG. 1, the terminal block cover 64 includes on its interior or backside two spaced, spring holding means 65A & 65B for the detent spring 62, into which the lower circular portion and the lower terminal tip leg of the spring 62 are held, respectively, holding the lower part of the detent spring in a fixed position relative to the cover and the beam selector carrier 46. The upper, longer leg of the detent spring 62 is able to move laterally (left and right) with respect to the cover 64 and the beam selector carrier 46. It will move to the right from its "natural" position (as illustrated in full line in FIG. 2) against its own internal spring torsional load, when it is so driven by the right-most cam periphery (61A); and to the left when it is so driven by the left-most cam periphery (61B) against its own internal spring torsional load, until it can spring back to its "natural" that is, to its non-externally-driven, disposition.

The detent spring 62 and the cam 56 are designed to latch and control the relative movements of the lower carrier 46 with respect to the over-all terminal body or enclosure 2/64. Thus, instead of the embodiment illustrated, the spring 62 could be mounted on the carrier 46, while the cam 56 could be provided on the cover or other static part of the over-all terminal enclosure or structure.

The cover 64 also includes orthogonally extended, snap legs 66 for snap latching the cover onto the terminal block 2. When the cover 64 is snapped onto the block 2, it closes off the interior between them (except for the upper "cut out" portion 20) and holds all the interiorly contained, appropriately assembled elements of the switching system 1 together under spring compression created in the vertical or longitudinal and orthogonal directions by the return spring 48 and the contactor springs 42 & 54, respectively.

Operation

The "home" position of the switch, as represented by the position of the detent spring 62, is illustrated by the spring in full line of in FIG. 2 with the darken tip 63 being marked as the "HOME POSITION," and is the first fully detented position or low beam mode of the switch 1. In the "home" position the beam selector contact dimples 50 & 51 are located at the upper portions of the pad strips 8A & 10A bridging across them, electrically interconnecting the low beam terminal 8 to the beam selector feed terminal 10.

When the exterior projection 26 is initially pushed down by action of the user, typically by the driver with a pull motion moving a stalk lever whose movement is translated against the projection 26, the "flash-to-pass" carrier 24 and the beam selector carrier 46 are pushed down in combined fashion against the resisting force of the lower return spring 48.

As this occurs, the floating contactors 38 & 52 begin to move longitudinally down with respect to the terminal block 2, causing the "flash-to-pass" contact dimples 40 & 41 to move down along the dimple tracking line 22A and the beam selector contact dimples 50 & 51 to move down along dimple tracking lines 22B & 22C, respectively. Meanwhile, the detent spring tip 63 moves relatively up and over to the right, as it is moved by the downwardly moving, offset right wall of the cam 56 (see FIG. 2). During this initial travel, the beam selector contacts 50 & 51 continue to bridge across and electrically interconnect terminal contact pads 8A & 10A and hence the low beam terminal 8 to the beam selector feed terminal 10, maintaining that part of the circuit closed. Meanwhile, the "flash-to-pass" contact dimples 40 & 41 merely ride down along the pad 6A, effectively being electrically neutral with respect to the light switching circuitry.

However, when the lower contact dimple 41 comes into contact with the upper portion of the pad 4A, after an exemplary two millimeters of travel, the two pads 4A & 6A are bridged across, electrically interconnecting the "flash-to-pass" feed terminal 4 to the high beam terminal 6 in the circuitry. This causes the high beams of the vehicle headlights to be flashed "on" and is represented by the darkened circle representing the relative position of the detent spring tip 63 marked as "FTP ON" in FIG. 2, while the low beam line to feed line interconnection is maintained. If the driver then releases the actuating stalk lever, the upper, "flash-to-pass" carrier 42 and lower, beam selector carrier 46 are moved back up toward their initial "home" positions by the lower return spring 48, breaking the bridging interconnection between pad strips 4A & 6A. This causes the "flash-to-pass" circuitry to be reopened, producing the complete "flashing" action of the high beams by the quick release of the actuating lever.

This is the momentary position of the switch 1. Multiple flashing operations of course are possible by the driver repeating the foregoing momentary sequences.

On the other hand, if, rather than releasing the lever, the driver pulls the lever back further, the carriers are further moved down against the lower return spring 48. With an additional exemplary travel of one millimeter, the beam selector contact dimple 50 moves off of the low beam pad 8A and onto the laterally projecting, side portion 6B of the high beam pad 6A, causing the low beam switch to the feed terminal 10 to be opened and the high beam switch to the feed terminal 10 to be closed. As the lever is moved still further by the driver, the tip 63 of the detent spring 62 moves up and over the right side, projecting tip 60A, at which point the torsional load in the spring causes the tip 63 to then move over toward the center against the downwardly projecting center stop 60B.

When the driver then releases the lever, the lower return spring 48 causes the lower carrier 46 to move up an exemplary one millimeter until the upper plateau 60 of the cam hits the orthogonally projecting spring tip 63, preventing any further upward movement of the carrier 46. At this point the spring tip 63 is able to clear under the central stop 60C and moves left across the plateau 60, until it hits the projecting tip on the left side of the cam 56, which is to the left of the central stop 60B. At this point the beam selector carrier is latched into its high beam mode. Meanwhile, with nothing to impede its upward travel until it reaches its "home" position, the upper, "flash-to-pass" carrier is moved up and away from the lower carrier by the upper, "weaker" return spring 44 sandwiched between them. This is the second, fully detented position or high beam mode of the switch 1 and is represented in FIG. 2 by the darkened circle for the spring tip position marked "HI BEAM ON."

When it is desired to unlatch the lower, beam selector carrier 46 and take the switch out of its high beam mode, the driver again pulls the stalk lever, applying force down against the upper carrier 24 until it bottoms out at an exemplary five millimeters of travel, that is, until the bottom surface of the lower carrier 46 comes into contact with the lower panel of the terminal block 2. While this occurs, toward the end of the travel, the detent spring tip 63 moves up and over the left side projecting tip 60C, unlatching the lower carrier from the orthogonally projecting spring tip. The lower carrier is then free to be pushed up by the lower return spring 48, causing the detent spring tip 63 to be moved right, as it follows the relative path shown to the left of the offset, left wall 61B of the cam 56.

This causes the upper leg of the detent spring 62 to be deflectively driven past its more centrally located "home" or "natural" position, until it gets clear of the bottom cam tip 58, allowing it then to inherently move back to its "natural/home" position. During this return travel the two carriers 24 & 46 have returned to their "home" positions under the action of the lower return spring 48.

Thus, from the initial low beam or "home" mode, to its "flash-to-pass" mode, to its latched high beam mode and finally back again to its "home," "low beam" mode, the switch 1 has been put through one complete duration of a cycle, which of course can be repeated as often as desired.

Alternate Embodiment

Figure 4:
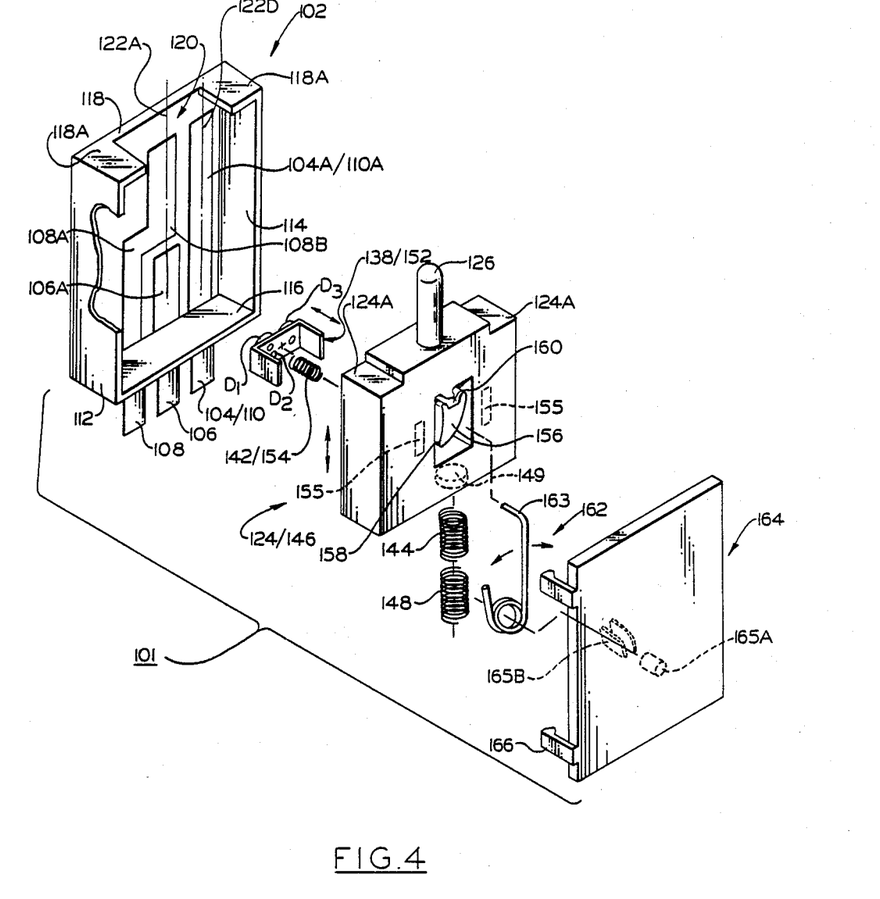
FIG. 4 is an isometric, exploded view of a second exemplary embodiment of the switching system of the present invention, showing its various elements in exploded array, similar to the embodiment of FIG. 1, but with the separate beam selector contactor and the "flash-to-pass" contactor and their two associated springs of the embodiment of FIG. 1 combined into one composite contactor with three contact dimples and only one associated spring, and with the two carriers and their two associated, different strength springs of the embodiment of FIG. 1 combined into one carrier with one spring having two portions having different strength portions (or alternatively two nested springs), for a three terminal system.
Figures 5, 6:
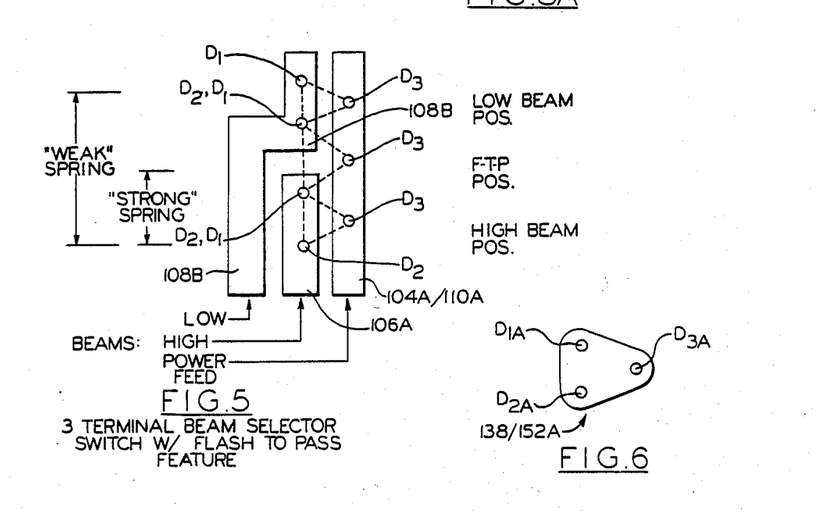
FIG. 5 is a front, close-up view of the three longitudinally extended, profiled contact pads of the embodiment of FIG. 4, showing the various circuit making positions of the switching system, as the single contactor with its three contact dimples is moved down across the faces of the contact pads.
FIG. 6 is a rear, close-up view of an alternate, single, floating contactor with three dimples substantively identical to the floating contactor of FIG. 4, but having a triangular configuration in place of the rectangular configuration of the contactor of FIG. 4.

An alternate, exemplary embodiment for the switching system of the present invention is illustrated in FIGS. 4 & 5, in which the two separable carriers of the embodiment of FIG. 1 are replaced by a single movable carrier 124/146 carrying a single "floating" contactor 138/152 working in conjunction with three terminal strip pads 104A/110A, 106A & 108A. In essence, rather than using separate feed terminals 4 & 10 as in the terminal block 2 of FIG. 1, the terminal block 102 combines them into one feed terminal 104/110.

Additionally, rather than using the two, substantially vertically spaced, return springs 44 & 48 of the embodiment of FIG. 1, a single spring 144/148 could be used having, if so desired, two sections differing in strength or having different spring constants, or, as illustrated generally in FIG. 4, two separate springs 144 & 148, nested one spring 144 rested inside the spring 148. The weaker one should extend above the stronger one, allowing the user to feel a lesser resistance in the initial "flash-to-pass" travel, but a greater resistance as the high beam selector travel is beginning and is traversed. This varying resistance, tactile feed back, through its "feel," guides the user as to the mode the switching control lever is being put in.

However, since only one carrier is needed in this second, alternate embodiment, a single return spring could be used, if so desired.

As a further, return spring alternative, a separate "weak" spring could be used to separately return the lever arm stalk to its "home" position, when the single carrier 124/146 is latched down in position, isolating the lever stalk from the force(s) of the return spring(s) located below the carrier. This separate, relatively "weak" spring could be provided up at the top of the carrier in association with, for example, the post 126 and work in conjunction with the exterior of the terminal block 2, or even be integrated into the control lever actuation arm itself. Of the first of these latter two examples, the "weak" spring would be exercising its biasing force in a pulling up, rather than a pushing up manner, while in the second it could be either pushing or pulling, depending on how it was connected to and associated with the control lever stalk. In either event it is desirable and preferable that the biasing force(s) be applied either directly or indirectly to the lever arm, in a way that causes it to always return to the same "home" position when pressure on it from the user is removed, regardless of the switch mode that the switch 101 is in. These same alternate approaches are applicable to the relatively "weak" spring 44 of the embodiment of FIG. 1.

The combined contactor 138/152 includes on its back side three contact dimples $D_1$, $D_2$ & $D_3$. The first two dimples $D_1$ & $D_2$ are vertically aligned and spaced dimples, which together travel along dimple tracking line 122E, and one $D_3$ is a laterally spaced dimple centrally located vertically between the other two. The third dimple $D_3$ travels along dimple tracking line 122D always in contact with the power feed pad 104A/110A.

As can be seen in FIGS. 4 & 5, the low beam pad 108A has a laterally projecting, side portion 108B, which extends over above the upper, longitudinal extension of the adjacent, high beam pad 106A.

As can be further seen in the upper portion of FIG. 5, in the "home" or low beam position the initial or starting position of the contactor 138/152 causes the dimples $D_1$ & $D_2$ to bridge across and electrically interconnect the low beam terminal pad 108A to the feed pad 104A/110A. In the lower, "flash-to-pass" momentary position, contact dimples $D_2$ & $D_3$ electrically interconnect the high beam terminal pad 106A to the feed pad 104A/110A, while dimples $D_1$ & $D_3$ maintain the low beam circuit closed for the "flash-to-pass" operation. Then, in the lowermost, latched high beam position, both dimples $D_1$ & $D_2$ are on the high beam pad 106A, causing only that part of the circuit to be closed.

Because dimple $D_3$ is always in contact with the feed pad 104A/110A and at least one of the other two dimples is always in contact with either the low or high beam pads 108A, 106A, no "black out" can occur when one of the vertically aligned dimples $D_1$ or $D_2$ is passing through the space between adjacent terminal pads, as it travels from one beam pad to the next. Additionally, of course, the longitudinal dimension of the dimples could be dimensioned to be larger than the separation distance between the longitudinally spaced pads across which they travel.

As the single carrier 124/146 is moved down under the selective action of the driver moving the lever stalk, the detent spring 162 and its orthogonally projecting tip 163 co-act and move, in relationship to the periphery of the asymmetrical "heart" shaped cam 156, in like fashion to the spring 62 and cam 56 of FIG. 1.

An alternate embodiment for the single floating contactor is shown in FIG. 6. The triangularly configured contactor 138/152A carries on its back side three similar contact dimples $D_{1A}$, $D_{2A}$ & $D_{3A}$, but with the feed contact dimple $D_{3A}$ being larger in size to handle the double flow of current when the contactor is in the intermediate, "flash-to-pass" position.

Because of the similarity in operation and structure of the two embodiments of FIGS. 1 & 4, further detail explanation of the latter would be redundant. However, for further guidance, it is noted that like reference numbers are used in the alternate embodiment to that of the first embodiment, with the former using identical numbers as the latter but in the hundred series.

Figure 7:
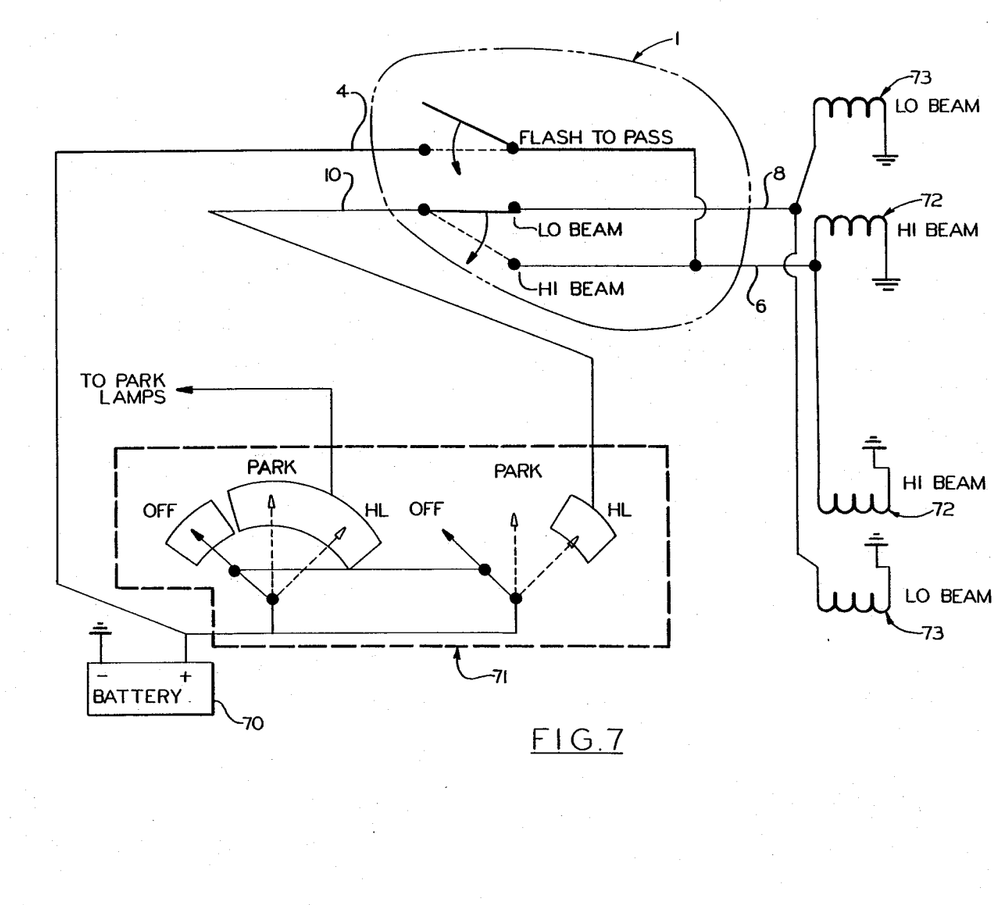
FIG. 7 is a schematic of the basic exemplary automotive circuitry with which the embodiment of FIG. 1 of the switching system of the present invention can be used.

Exemplary Circuitry (FIG. 7)

As can be seen in FIG. 7 in association with the embodiment of FIG. 1 the "flash-to-pass" power feed terminal 4 is connected to one side of the vehicle's power source, typically a twelve volt DC battery 70, while the beam selector power feed terminal 10 also is connected to the same side of the vehicle's power source, but only after passing through the main headlight switch 71. As is well know, the main headlight switch 71 is typically a pull-push switch combined with a rotary switch (or simply a rocker switch), usually mounted on the dashboard, for turning the headlights "on" and "off."

The "hi" beam and the "lo" beam terminals 6 & 8 are connected to the other side of the vehicle power source through the high beam and the low beam filaments 72 & 73, respectively, of the vehicle headlight(s). Thus, when the "flash-to-pass" carrier movement causes the contactor dimples 40 & 41 to bridge the pads 4A & 6A (and hence the terminals 4 & 6), the high beams are flashed "on" regardless of the state of the main headlight switch 71. In contrast, the electrical effectiveness of the actions of the bridging of the beam selector feed pad 10A (and hence the feed terminal 10) to either the "lo" beam or the "hi" beam pads 8A or 6A (and hence the terminals 8 or 6) is dependent on the status of the main switch 71.

The system circuitry for the embodiment of FIG. 4 would be similar to that shown in FIG. 7, except that, in order to use a common power feed line terminal 104/110, the "B+ From Batt. FTP" line or wire would be eliminated and terminal 4 would be "merged" into terminal 10. Thus, the "flash-to-pass" mode of switch 101 will actually flash the high beams 72 only when the main headlight switch 71 is closed. Such a system particularly would be useful in those automotive systems in which the headlight(s) are always "on" when the vehicle is in operation, even in daylight.

It is noted that various "relative" terms, such as vertical and horizontal, up/down, right/left, back/front, etc., are used in describing the various elements and their relationships or relative movements with respect to one another, or in relationship to how they are illustrated in the drawings. It should be understood that these terms are not being used in their "absolute" sense, but only in a relative way. Thus, in actual use, for example, the terminal block 2 typically will not be mounted in a vehicle in the "vertical" disposition of FIG. 1 but usually would be at an angle, lying along the longitudinal axis of the steering column. Additionally, the "longitudinal" direction typically would be in the direction of the linear movement of the carrier(s) as the carrier(s) move(s) from switch mode to mode.

With respect to an exemplary vehicle, steering column mounted, control stalk, which could be adapted for use as the lever stalk used by the driver to actuate the switching system 1 or 101, reference is had to the commonly owned, co-pending U.S. patent application Ser. No. 07/226,170 filed July 7, 1988, entitled "Modularly Constructed Vehicle Control Stalk With Interchangeable Parts" of Vidican, Bogovican, Herrera & Wiersing, the last name inventor being a co-inventor hereof.

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

We claim:

1. A headlight beam selector switch system with a "flash-to-pass" mode, comprising:
   a terminal block having a contact pad panel;
   at least three longitudinally extended, profiled terminal pads located on said contact pad panel, at least one of which has a laterally extending, side portion which extends over to the longitudinal axis of extension of one of the other of said pads;
   a carrier structure having an upper member and including at least one, linearly movable carrier having
   a contact pad terminal side,
   an upper portion, and
   a downwardly extending portion, said downwardly extending portion providing a latching member, said one carrier being linearly movably disposed in said terminal block and being temporarily latchable in a lowered, high beam selected position;
   a switch actuating member associated with said upper member of said carrier structure and dimensioned and positioned to be contacted from outside of said terminal block to cause actuation from outside of said terminal block and cause movement of said one carrier to move down to its lowered, high beam selected position;
   a "flash-to-pass" and beam selector contactor structure having at least three, separate, electrical contact areas carried thereby and positioned and dimensioned to bear in sliding contact on said profiled contact pads as said one carrier is linearly moved along said contact pad panel causing differing combinations of said pads to be electrically interconnected by said contact points in association with said contactor structure;
   contactor structure mounting means mounting said "flash-to-pass" and beam selector contactor structure on said contact pad terminal side of said carrier structure including biasing means urging said contact areas toward said profiled terminal pads;
   a co-acting latching structure associated with said one carrier and said terminal block capable of latching said one carrier down in its lowered, high beam selected position and unlatching when said actuating member is cyclically again moved down to the high beam selected position; and
   beam selector return carrier biasing means associated with said one carrier biasing the longitudinal, linear positioning of said beam selector contact areas with respect to said profiled terminal pads away from said latching position toward their "home" positions.

2. A headlight beam selector switch system as set forth in claim 1, wherein there is included:
   at least four terminal contact pads on said panel, including
   a beam selector power feed pad,
   a high beam pad,
   a low beam pad, and
   a separate, "flash-to-pass" power feed pad; and in which said carrier structure further includes:
   a second, upper, movable carrier having a terminal side and being located above said one carrier, said second carrier being associated with, but separately movable upwardly in the longitudinal direction from, said one carrier;
   a separate beam selector contactor having at least two contact areas thereon and carried by said one carrier;
   separate beam selector contactor mounting means mounting said beam selector contactor to said terminal side of said one carrier including biasing means urging said beam selector contactor towards said profiled terminal pads;
   a separate "flash-to-pass" contactor having at least two contact areas thereon and carried by said second, upper carrier; and
   separate "flash-to-pass" contactor mounting means mounting said "flash-to-pass" contactor to said terminal side of said second carrier including biasing means urging said "flash-to-pass" contactor towards said profiled terminal pads.

3. A headlight-beam selector switch system as set forth in claim 2, wherein said downwardly extending portion also includes:

longitudinally extended, sliding surfaces interfacing with longitudinally extended, sliding surfaces on said second carrier maintaining their relative alignment of said carriers about their common longitudinal axes as said second carrier moves up with respect to said one carrier when said one carrier is in its latched position.

4. A headlight-beam selector switch system as set forth in claim 2, wherein there is further included:
separate "flash-to-pass" return carrier biasing means, associated with said second carrier, always biasing the longitudinal positioning of said "flash-to-pass" contact points with respect to said profiled terminal pads toward their "home" positions irrespective of the disposition of said one carrier.

5. A headlight-beam selector switch system as set forth in claim 2, wherein:
said separate "flash-to-pass" return carrier biasing means is a spring having a strength less than said beam selector return carrier biasing means.

6. A headlight beam selector switch system as set forth in claim 1, wherein said co-acting latching structure associated with said one carrier and said terminal block further includes:
a detent cam providing an irregular surface completely surrounding the cam offset to one side of the longitudinally extended, centerline axis of said cam; and
a detent spring having a detent cam engaging portion which co-acts with engages said irregular surface as it travels around said cam, said detent spring latching said one carrier down when it engages and is held within the upper, top portion of said cam, said profiled terminal pads, said "flash-to-pass" contact areas and the beam selector contact areas being positioned to select, a first fully detented low beam position, a momentary "flash-to-pass" position, and a second fully detented high beam position under the movement of said actuation member, resulting in the latching and unlatching movements of said one carrier.

7. A headlight beam selector switch system as set forth in claim 6, wherein said detent cam comprises an asymmetrical heart shape.

8. A headlight-beam selector switch system as set forth in claim 7, in which there is further included:
a terminal block cover having an interior side having detent spring securement means for securing the detent spring allowing said engaging end of said detent spring to reside and travel in the irregular groove surrounding the detent cam; and
cover securement means associated with said cover securing the cover to said terminal block.

9. A headlight beam selector switch system as set forth in claim 1, in which said extended, profiled terminal pads comprise:
 (a) a low beam terminal pad;
 (b) a high beam terminal pad; and
 (c) at least one feed terminal pad making available electrical power to said low and said high beam terminal pads; all of which terminal pads are accessible to the exterior of said terminal block.

10. A headlight beam selector switch system as set forth in claim 9, in which there is included in association with said high beam terminal:
 (d) a "flash-to-pass" feed terminal making available electrical power to the switch independently of said one feed terminal.

11. A headlight beam selector switch system as set forth in claim 9, in which:
there is only one power feed terminal pad; and
said carrier structure includes only one carrier, and said contactor structure comprises only one contactor, said only one contactor having three contact areas following only two contact tracking lines.

12. A headlight beam selector switch system as set forth in claim 11, in which:
said three contact areas define a triangle, the apex of which is positioned laterally with respect to the base of the triangle, the base lying on a longitudinally extended line.

13. A headlight beam selector switch system as set forth in claim 11, in which:
said only one contactor having a base upon which said contact areas are located, said base being triangular in its configuration.

14. A headlight beam selector switch system, including a "flash-to-pass" mode, comprising:
 (a) a terminal block being generally rectangular in shape having a top panel, two side panels, a bottom panel and a back panel, said block having a cut-out portion;
 (b) four profiled terminal pads located on said back panel;
 (c) a first carrier having a terminal side, a spring side, an upper portion and at least one downwardly extending leg portion, said leg portion having longitudinally extending sliding surfaces, and said first carrier being slidably disposed in said terminal block;
 (d) a switch actuation means being exposed to the exterior of said terminal block through said cut-out located in said block for actuating said first carrier;
 (e) a "flash-to-pass" contactor;
 (f) "flash-to-pass" mounting means mounting said "flash-to-pass" contactor to said first carrier including biasing means urging said "flash-to-pass" contactor towards said profiled terminal pads;
 (g) a second carrier having a terminal side, a spring side, and a plurality of sliding surfaces co-acting with said sliding surfaces of said first carrier, said second carrier being slidably disposed with said first carrier below said first carrier, said second carrier being capable of being temporarily latched down within said terminal block;
 (h) a beam selector contactor;
 (i) beam selector contactor mounting means mounting said beam selector contactor to said terminal side of said second carrier including biasing means urging said beam selector contactor toward said profiled terminal pads;
 (j) return biasing means biasing the longitudinal positioning of said second carrier in the direction toward said first carrier with respect to said profiled terminal pads;
 (k) secondary biasing means biasing the longitudinal positioning of said first, "flash-to-pass" carrier away from said second carrier with respect to said profiled terminals when said second carrier is latched down;
 (l) detent cam means associated with the spring side of said second carrier;
 (m) a detent spring having a detent cam engaging end co-acting with said cam means;

(n) a terminal block cover having means for securing said detent spring so as to allow said detent cam engaging end of said spring to engage said detent cam means; and (o) cover securement means securing said cover to said terminal block; said profiled terminal pads, said "flash-to-pass" contactor and said beam selector contactor being positioned to select a first, initial, fully detented, low beam position, a momentary "flash-to-pass" position, and a second, fully detented high beam position.

15. A headlight beam selector switch system as set forth in claim 14, in which said profiled terminal pads comprise:
a rectangularly shaped beam selector feed terminal pad being adjacent to one of said side panels of said terminal block;
a low beam terminal pad being adjacent to said beam selector feed terminal pad and being generally rectangular and having a cut-out portion located at a predetermined distance from said bottom panel and opposite of said beam selector feed terminal pad;
an irregularly shaped high beam terminal pad being adjacent to said low beam terminal pad, said high beam terminal pad having a beam selector contact portion extending toward said low beam terminal pad and sized to nest within said cut-out portion of said low beam terminal pad without making electrical contact with it, said high beam terminal pad having a "flash-to-pass" contact portion extending toward the remaining side of said terminal block at a predetermined distance from said bottom panel of said terminal block; and
a rectangularly shaped "flash-to-pass" feed terminal pad located adjacent to said high beam terminal pad and terminating short of said "flash-to-pass" contact portion of said high beam terminal pad, said beam selector contactor making and breaking electrical circuits between said beam selector terminal pad and said high and low beam terminal pads, and said "flash-to-pass" contactor making and breaking electrical circuits between said "flash-to-pass" terminal pad and said high beam terminal pad by said contact points following longitudinal paths along respective terminal pads in a response to selected switch actuation positions of said switch actuation member.

16. A headlight beam selector switch system as set forth in claim 14, in which said biasing means for biasing the longitudinal positioning of said contact points with respect to said profiled terminals further comprises:
a first spring element abutting said bottom panel of said terminal block;
a second spring element abutting said bottom panel of said terminal block; and
a spring element receiving area being located in said lower portion of said second carrier sized to accommodate said first and second spring elements, said first spring element providing a biasing force that must be overcome in order to activate said "flash-to-pass" position, and said second spring element must be subsequently overcome in latching said second carrier.

17. A headlight beam selector switch system electrically associated with the circuitry for switching on and off the high and low beam parts of a vehicle's headlight(s) and having a "flash-to-pass" mode, comprising:
a base having a series of at least three longitudinally extended, configured, terminal pads having longitudinally extended surfaces, at least one of said terminal pads having a laterally projecting side portion extending over into an adjacent pad area, at least one feed pad electrically associated with a source of electrical power, a low beam pad electrically associated with the low beam part of the vehicle headlights, and a high beam pad electrically associated with the high beam part of the vehicle's headlight(s);
at least one, linearly movable carrier supported for and capable of linear movement along side of and parallel to the extended surfaces of said pads;
a contactor carried by said carrier for common linear movement therewith being located between said carrier and said base and having at least two contact areas thereon which bear against said longitudinally extended surfaces making electrical contact with at least two electrically associated pads electrically interconnecting them as said contactor linearly moves over said base; and
at least a third contact area carried by a structure associated with said one carrier, located between said structure and said base, and linearly moving in common with said one carrier at least part of the time, making electrical contact with at least the third pad, electrically interconnecting it to at least one of the other pads as said third contact area linearly moves over said base; said contact areas and said pads,
electrically interconnecting said low beam pad to said one feed line during the first part of the linear movement of said one carrier;
then also electrically interconnecting the high beam pad to a feed pad allowing the sending of an electrical signal to the high beam portion of the headlights while the low beam pad is maintained in electrical interconnection with said one feed pad as said one carrier is moved to a further, intermediate, linear position, providing a "flash-to-pass" operation, and
then further electrically interconnecting the high beam pad to a feed pad as said one carrier is moved to a final linear position, providing high beam operation.

18. The headlight-beam selector/"flash-to-pass" switching system of claim 17, wherein there is further included:
a second power feed pad electrically associated with a source of electrical power;
a second carrier serving as said structure, said second carrier being capable of separate, linear movement away from said one carrier while moving along the same linear axis as the linear movement of said one carrier;
a second contactor, said third contact area being located on said second contactor; and
a fourth contact area located on said second contactor, said four contact areas defining three, parallel tracking lines as said carriers and said contactors linearly move throughout their linear travels with respect to said base.

* * * * *